United States Patent [19]
Ricardo

[11] Patent Number: 5,464,194
[45] Date of Patent: Nov. 7, 1995

[54] CUTTING TORCH TIP WITH GUIDE

[76] Inventor: Marvin Ricardo, 6825 W. Flagler St., Apt. #203, Miami, Fla. 33144-2823

[21] Appl. No.: 195,107

[22] Filed: Feb. 14, 1994

[51] Int. Cl.⁶ .................................................. B23K 7/10
[52] U.S. Cl. ................................................ 266/66; 266/48
[58] Field of Search .............................. 266/48, 66, 76, 266/77, 71, 72

[56] References Cited

U.S. PATENT DOCUMENTS

| | | | |
|---|---|---|---|
| 1,474,957 | 11/1923 | Dorsey | 266/66 |
| 2,486,575 | 11/1949 | Rooke | 266/66 |
| 4,176,829 | 12/1979 | Dixon | 266/66 |
| 4,579,318 | 4/1986 | Keedy | 266/66 |

FOREIGN PATENT DOCUMENTS 0513590  9/1952  Belgium ................................ 266/66

*Primary Examiner*—Scott Kastler
*Attorney, Agent, or Firm*—Sanchelima and Associates

[57] ABSTRACT

An improvement for cutting torch tips of the type that include at least two orifices at the end of the tip connected to longitudinally extending channels. Two slanted surfaces sandwich a protruding guiding member that is cooperatively inserted inside the kerf being formed by the cutting flame. The guiding member keeps the tip from abruptly moving away from the kerf path and the slanted surfaces providing a smooth surface over which the user applies moderate sliding force for further steadying the cutting operation. In this matter complex cutting paths can be followed. The slanted surfaces can be curved to provide a degree of flexibility on the angle of the tip with respect to the surface of the material area being cut.

10 Claims, 3 Drawing Sheets

FIG - 1 -

CUTTING TORCH TIP WITH GUIDE

BACKGROUND OF THE INVENTION

1. Field of the Invention

The present invention relates to torch tips, and more particularly, to those torch tips that include guide means that ride on the edges defining the kerf being created.

2. Description of the Related Art

Applicant believes that the closest reference corresponds to U.S. Pat. No. 4,176,829 issued to Dixon and entitled Burner Tip Drag Guide. However, in Dixon's device, the angle at which the tip rides with respect to the plane of the material being cut is an awkward one. Also, the resulting separation between the tip and the surface being cut prevent the hottest part of the flame from performing its cutting function efficiently. Finally, the separation of the guide from the cutting flame prevents Dixon's device from following curved paths.

Another such devices is described in U.S. Pat. No. 2,486,575 issued to Rooke and entitled Drag Attachment for Hand Cutting Torches. This device, however, substantially obstructs a user's visibility and, like in Dixon's, it is separated from the flame orifices of the tip thereby exposing the guide to higher temperatures than in the present invention.

Other patents describing the closest subject matter provide for a number of more or less complicated features that fail to solve the problem in an efficient and economical way. None of these patents suggest the novel features of the present invention.

SUMMARY OF THE INVENTION

It is one of the primary objects of the present invention to provide a long lasting cutting torch tip with a guide that will permit a user to single-handedly cut channels in metal sheets following different non-linear paths even when the sheets are concave or convex, as it iS the case with tubular pieces.

It is another object of the present invention to provide a cutting torch tip that does not require the use of any moving parts and that it can be integrally built on a torch tip.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
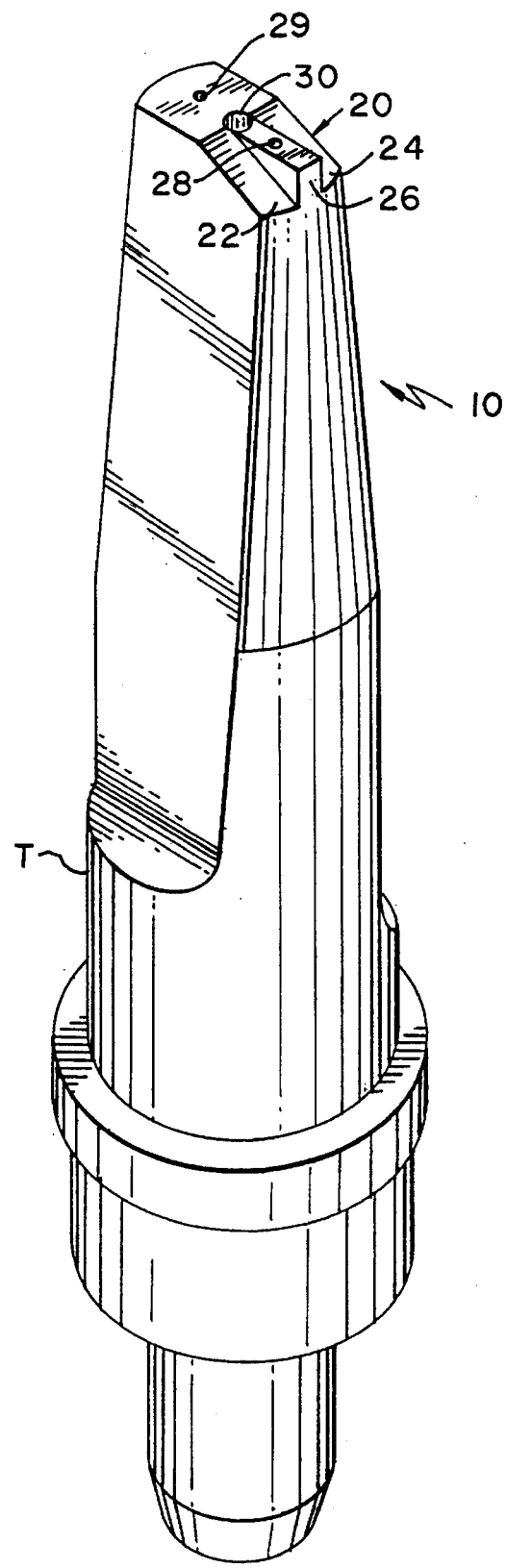
FIG. 1 represents an isometric view of a conventional cutting torch tip where the present invention has been incorporated.
Figure 3:
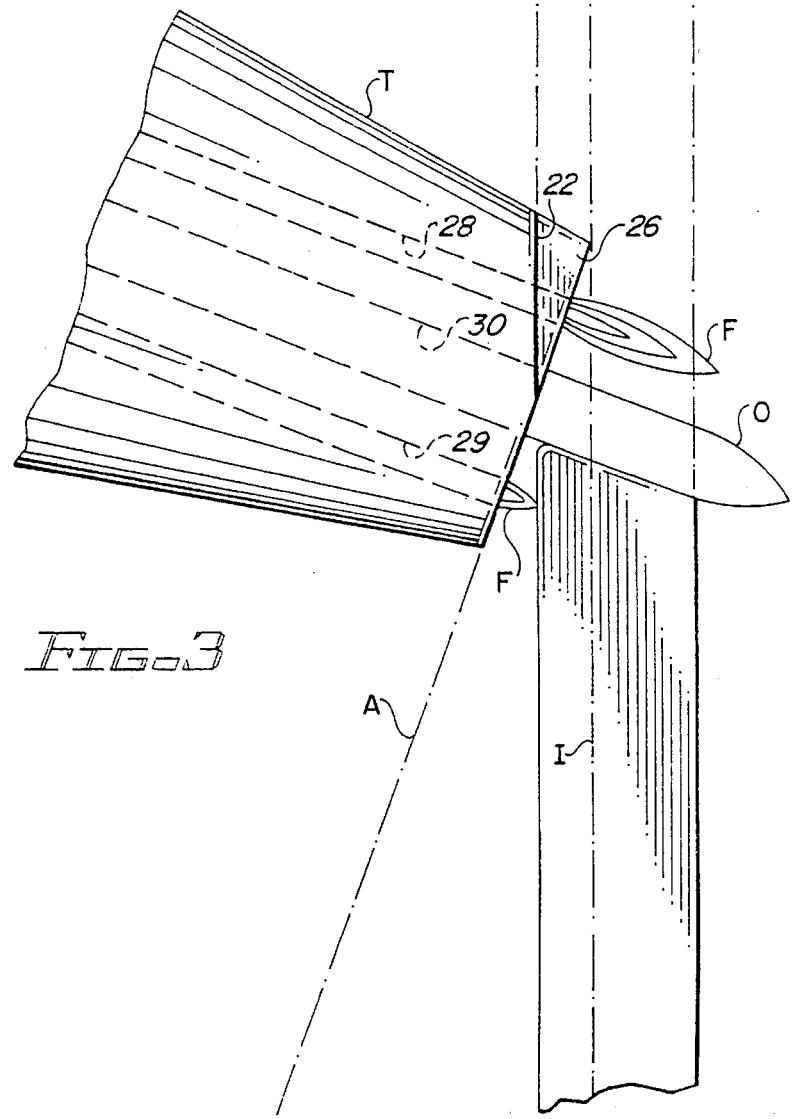
FIG. 3 illustrates the torch tip shown in the previous figures cutting a metal sheet and also showing one of the shoulders of the guide member at the surface level and the guide member itself inside the kerf.

Referring now to the drawings, where the present invention is generally referred to with numeral 10, it can be observed that it basically consists of an improvement upon conventional cutting torch tips by providing guiding assembly 20 that uses the kerf created by the cutting function of tip T. Guiding assembly 20 is formed, in the preferred embodiment, with slanted surfaces 22 and 24 that sandwich guiding member 26 as seen in FIG. 1. Slanted surfaces 22 and 24, in the preferred embodiment, provide an angle of support with respect to the plane of the area of the material being cut as defined by imaginary lines A and I. Guiding member 26 then takes the shape of a protruding triangle, as seen from the side that comes inside the kerf being created by the cutting jet of oxygen O just ahead of it during a cutting operation as best seen in FIG. 3. Guiding member 26 includes oxyacetylene orifice 28, and part of oxygen orifice 30. Oxyacetylene orifice provides a preheating function. Flame F comes out of orifices 28 and 29, as best seen in FIG. 3. Oxyacetylene orifices 28 and 29 are smaller in diameter than oxygen orifice 30 from which oxygen jet O is projected. It is important for fuel orifices 28 and 29 to be smaller than oxygen orifice 30 to avoid excess debris in the kerf.

Tip T can be used also like conventional tips by causing guide member 26 to ride in front (towards the user) if desired. There are applications where this is preferable if not necessary. If the versatility of having the present tip work also as a conventional tip, is desired, then we need orifices 28; 29 and 30. But, if this versatility is not required then orifice 28 is not necessary.

The oxygen jet coming out of oxygen orifice 30 effectively cleans up the edges of the kerf from any debris or excess material left. Particularly, with the inclination of the oxygen jet a user can achieve a cleaner underside edge defining kerf. This is a direct result of the angle of the oxygen jet O flushing out most of the debris from the kerf. This results in kerf edges substantially perpendicular to the surface of the material being cut, and permits a seamless joint when a section needs to be patched. For instance, the hull of a ship may require replacement of a section. The section is cutout and replaced with another one of suitable matching dimensions. If the edges of the cut out opening are not substantially smooth and perpendicular to the surface of the hull, bulging areas will result when soldering the new section in place.

Figure 2:
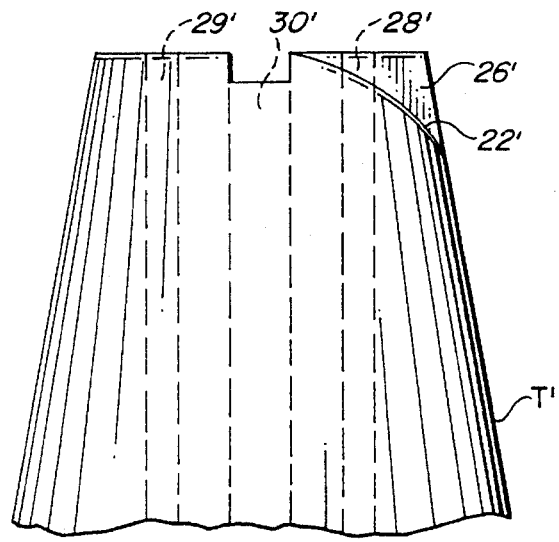
FIG. 2 shows a side elevational view of the end of a cutting torch tip with its internal flame orifices shown in phantom and the improvement subject of the present application.

An alternative embodiment for the improved torch tip T' is shown in FIG. 2. It is similar to the preferred embodiment except that the slanted surfaces 22' and 24' (not shown but it is similar to 22') are curved and not fiat. This will permit a user certain latitude in the positioning (angle) of the torch tip with respect to the plane of the area of contact of the material being cut. Guiding member 26' also rides, as with the preferred embodiment shown in FIG. 1, inside the resulting kerf with curved slanted surfaces 22' and 24' (not shown) sliding on the edges of the kerf Similarly, fuel orifices 28' and 29' and oxygen orifice 30' are provided as in the preferred embodiment.

Figure 4:
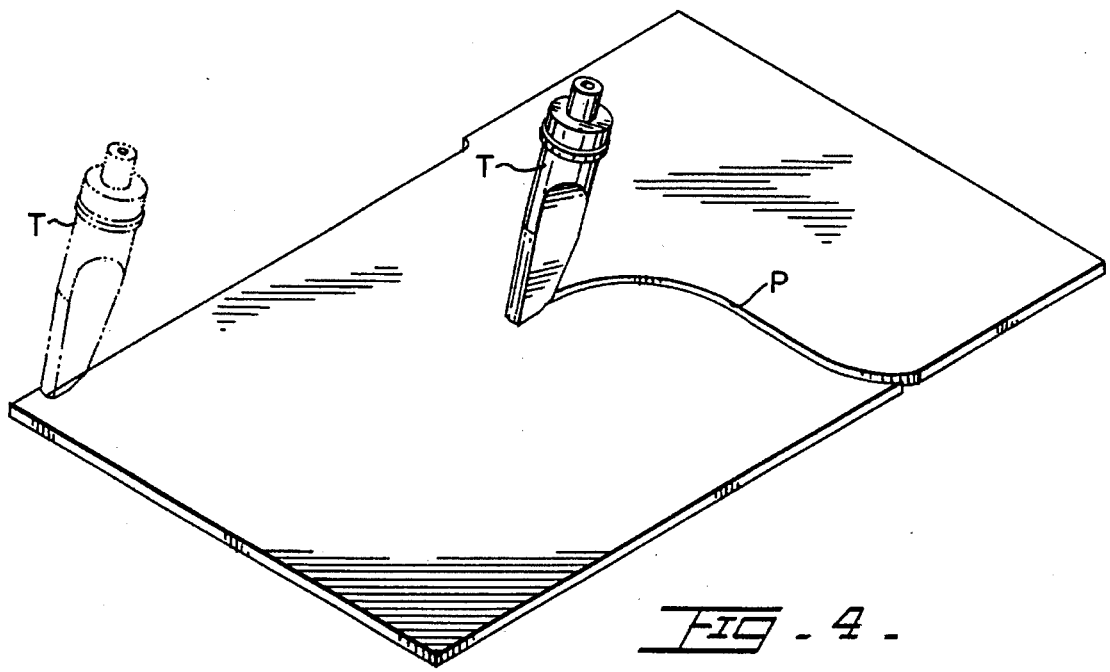
FIG. 4 is a view in perspective of the cutting torch tip following a non-linear path.
Figure 5:
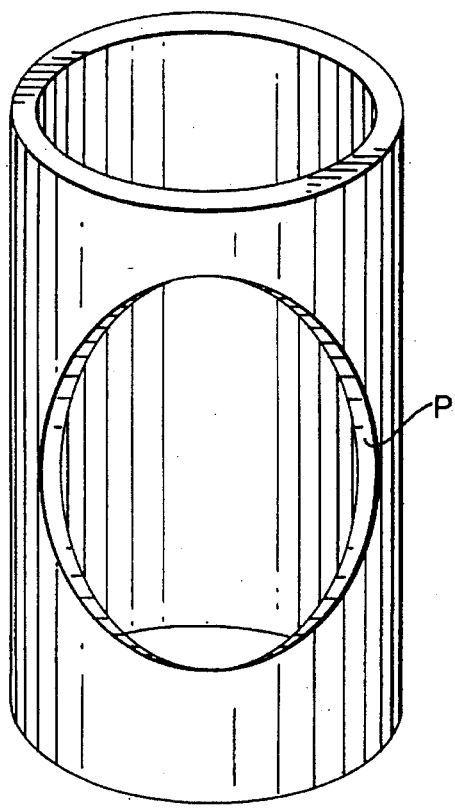
FIGS. 5 and 6 show tubular members with a representative circular cuts that can be achieved with a tip incorporating the teachings in the present invention.
Figure 6:
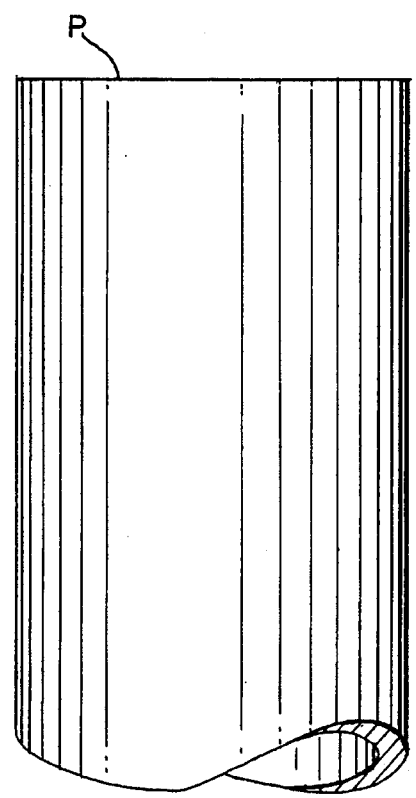

As seen in FIGS. 4, 5, and 6 complex cutting paths P can be followed. Specially on a curved surface, such as the one shown in FIG. 5, the features of the present invention become important. Conventional torch tips are not suitable to perform without the aid of additional accessories.

Even when the material to be cut is flat, the present invention can be used without requiring additional steps such as the temporary mounting of a ruler, and its subsequent removal. With the guiding stability provided by the guiding member a user can merely draw a line, straight or otherwise, and follow it with accuracy comparable to what is achieved with conventional torch cutting methods. This applies if the material to be cut is in a horizontal or vertical plane, or even if it is overhead.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. In a cutting torch tip having an end that comes in contact with the material being cut producing a kerf and said tip includes at least two outlets at the end of respective channels for conducting fluids that longitudinally extend internally along said tip, and said outlets include a fuel outlet and an oxygen outlet centrally disposed at that end and the improvement comprising two symmetrical slanted surfaces integrally formed at said end so that an axially protruding guiding member is integrally formed thereon and said protruding guiding member enters inside and is guided by said kerf and, and said protruding guiding member having said first fuel outlet.

2. The improvement set forth in claim 1 wherein said end has substantially a rectangular shape and said slanted surfaces extend to the longitudinal middle of said rectangular end.

3. The improvement set forth in claim 1 wherein said slanted surfaces are flat.

4. The improvement set forth in claim 2 wherein said slanted surfaces are inclined an angle between five and thirty five degrees with respect to the plane defined by said end and the protruding member.

5. The improvement set forth in claim 2 wherein said slanted surfaces have an archuated shape.

6. In a cutting torch tip having an end that comes in contact with the material being cut producing a kerf and said tip includes at least two outlets at the end of respective channels for conducting fluids that longitudinally extend internally along said tip, and said outlets include a fuel outlet and an oxygen outlet centrally disposed at that end and the improvement comprising two symmetrical slanted surfaces integrally formed at said end so that an axially protruding guiding member is integrally formed thereon and said protruding guiding member enters inside and is guided by said kerf and said fuel outlet being located opposite to said guiding member.

7. The improvement set forth in claim 1 wherein said end has substantially a rectangular shape and said slanted surfaces extend to the longitudinal middle of said rectangular end.

8. The improvement set forth in claim 1 wherein said slanted surfaces are flat.

9. The improvement set forth in claim 2 wherein said slanted surfaces are inclined an angle between five and thirty five degrees with respect to the plane defined by said end and the protruding member.

10. The improvement set forth in claim 2 wherein said slanted surfaces have an archuated shape.

* * * * *